(12) United States Patent
Nachum (10) Patent No.: US 8,090,788 B2
(45) Date of Patent: Jan. 3, 2012

(54) METHOD AND SYSTEM FOR FILTERING ELECTRONIC MESSAGES

(76) Inventor: Gal Nachum, Kiryat Ono (IL)

( * ) Notice: Subject to any disclaimer, the term of this patent is extended or adjusted under 35 U.S.C. 154(b) by 0 days.

(21) Appl. No.: 13/083,848

(22) Filed: Apr. 11, 2011

(65) Prior Publication Data

US 2011/0252104 A1 Oct. 13, 2011

(30) Foreign Application Priority Data

Apr. 13, 2010 (CA) .................................... 2698087

(51) Int. Cl.
*G06F 15/16* (2006.01)

(52) U.S. Cl. ........... 709/206; 709/203; 709/204; 725/30

(58) Field of Classification Search .................. 709/206, 709/203, 204; 725/30
See application file for complete search history.

*Primary Examiner* — Kyung H Shin
(74) *Attorney, Agent, or Firm* — GThe Law Office of Michael E. Kondoudis (57) ABSTRACT

The present invention discloses a system for blocking unsolicited emails. The system comprising: a server application for providing a filtering service between at least one protected and a second mail subscribe. The server application is comprised of: a communication module for establishing secure connections between at least two mail subscribers, a repository of secure connections including records of secure mail addresses created for each secure connection, an interception module for verifying secure messages by comparing the sender's address to the sender address in the secure connection repository, a transmission module for forwarding the verified messages to the public target mail address by translating between secure mail address and the public mail addresses of verified messages.

29 Claims, 4 Drawing Sheets

METHOD AND SYSTEM FOR FILTERING ELECTRONIC MESSAGES

BACKGROUND

1. Technical Field

The present invention relates to the field of communications, and more particularly, to filtering electronic messages.

2. Discussion of Related Art

Most services for filtering electronic messages screen the messages' text and identifying parameters, the elimination is based on identifying keywords, formats, patterns or known identifiers, such as the email address or the source IP. Such services provide only partial solution to spam mails and suffers from false-positive classifications, which force the subscribers to check their junk mailbox to reassure that mail message were not mistakenly classified as spam mail. These filters have to be frequently updated as the spammers change their spamming techniques to overcome the filtering services' algorithms.

Other solutions for preventing spam, suggest to create designated mailing addresses for email subscription services such as newsletters or forums. These solutions are effective but limited only to part of the spamming phenomena.

BRIEF SUMMARY

The present invention discloses a method for blocking unsolicited electronic messages transmitted through a data communication network, said method providing a filtering service for at least one mail subscriber having a public mail address, wherein said subscriber is protected from spam mail or other undesired mail ("protected subscriber"). The filtering service according to the present invention enables the following actions: establishing a secure connection between at least one protected mail subscriber and a second mail subscriber, both having public mail addresses, wherein the connection is established upon approval of the second subscriber by the protected mail subscriber, generating a secure new mail address for each protected subscriber in a secure connection, said new address is unique for the respective mail domain, recording said new address in association with the public mail address of the subscribers and sending the second subscriber the secure address to be used in future communication with the protected subscriber instead of its public mail address, translating the public target mail address of each message sent by the second subscriber to the associated secure mail address, intercepting and screening the incoming messages of the protected mail subscriber for identifying secure messages by checking whether the target address of the message is associated with a secure connection, verifying secure message by comparing the sender's address to the sender address in the secure connection repository and translating between secure mail address and the public mail addresses of verified messages, forwarding the verified message to the public target mail address of the protected subscriber.

The method may further comprise the step of intercepting and screening the outgoing messages of the protected mail subscriber and replacing the public sender address of the protected subscriber by the associated secure address when the recipient is an approved subscriber.

The establishment of a secure connection may require the second mail subscribers to fill in a request form before the protected subscriber approves his identity and/or the approval process may include a challenge response authentication procedure.

According the some embodiments of the present invention verified messages are forwarded to the inbox of the mail subscriber, and unverified messages are discarded, blocked, marked as SPAM, marked as unverified or forwarded to the junk mail folder of the protected mail subscriber.

For security reasons, a new secure address is generated for a secure connection when a message associated with said secure connection is not verified and the public mail address of mail subscribers blacklisted (see definition in the detailed description bellow) by the protected subscriber are blocked and messages coming from said addresses are discarded, or quarantined or defined as spam mail. According to some embodiments of the present invention unsecure messages are forwarded to the subscriber inbox according to subscriber selection and secure connection can further be established by automatically approving a group of mail subscribers.

According to further embodiments of the present invention both subscribers are protected by the filtering service and messages exchanged between them are intercepted, a separate secure mail address is generated for the respective protected mail subscriber, and each secure mail address is recorded and associated with the public and secure mail addresses of the corresponding mail subscriber. The process of transmitting messages between two protected subscribers, comprise: intercepting an outgoing mail, determining that the message recipient is associated with a secure connection, translating the target public mail address and the source mail address into the corresponding associated secure mail addresses, transmitting the modified message intercepting of the message, verifying the message and translating the sender's and receiver's secure addresses of verified messages into their public mail addresses and forwarding the message to the receiving party.

According to some embodiments of the present invention the method may include the step informing the second subscriber of the establishment of a secured one-way connection and sending him an invitation to join the secure connection, wherein upon approving said invitation a two way secure connection is established.

According to some embodiments of the present invention the secure mail address may change periodically according to predefined rules.

According to some embodiments of the server application it may pass transparently, without any modifications, messages sent by the protected subscriber to unapproved users thereby allowing it to communicate with them using unsecure addresses.

The present invention discloses a system for blocking unsolicited electronic messages transmitted through a data communication network. The system comprising: a server application for providing a filtering service between at least one protected mail subscribers and a second mail subscriber, said server application comprising, a communication module for establishing secure connections between at least two mail subscribers having a public mail address, wherein the connection is established upon the approval of the identity of a second subscriber by the protected mail subscriber, a repository of secure connections including records of secure mail addresses created for each secure connection, wherein secure new mail address are generated for each protected subscriber in a secure connection, said new address is unique for the respective mail domain, wherein each secure address is associated with the public mail address of a protected subscriber in a specific secure connection, an interception and screening module for identifying secure message by checking whether the address of the message is associated with a secure connection and for verifying secure message by comparing the sender's address to the sender address in the secure connection repository, a transmission module for forwarding the verified messages to the public target mail address by translating between secure mail address and the public mail addresses of verified messages and an exchange module for translating the public target mail address of outgoing messages of the second mail subscriber to associated secure mail address.

BRIEF DESCRIPTION OF THE DRAWINGS

The present invention will be more readily understood from the detailed description of embodiments thereof made in conjunction with the accompanying drawings of which.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention discloses a method and system for filtering unsolicited emails of mail subscribers. The system includes one or more server applications, residing on a mail server or on a mail proxy server, which is associated with electronic mail subscribers. The server application intercepts and screens all incoming and outgoing mail of the associated mail subscribers. The server application enables a mail subscriber which is protected by the service to establish secure connections with any other mail subscriber. The secure connection can be approved by one party (one way secure connection) or by both parties (two way secure connection). The secure connection is established through a handshake protocol. A subscriber is protected by the filtering service (hereinafter "protected subscriber"), when registering to the service or when the system enabled the subscriber to use its services. The protocol is most commonly initiated upon receiving a message from a mail subscriber transmitted to a second mail subscriber which is a protected subscriber. The server application associated with the protected subscriber intercepts the message, if there is no secure connection between the two mail subscribers, the server application starts a handshaking procedure, by requesting the protected subscriber to approve the identity of the second subscriber. Once the first subscriber is approved (hereinafter the "approved subscriber") the server application generates a unique mail address for the protected subscriber in the new secure connection (hereinafter the "secure address"). The secure address is recorded in a repository of secure connections with association to the public mail addresses of the corresponding mail subscribers. Once the secure connection is established the protected subscriber can exchange emails using his original public mail address through the server application. The server application functions as an intermediator between the two subscribers translating between the secure addresses and the public addresses and verifying the messages in the secure connection by checking the association of the secure address appearing at the intercepted messages to the corresponding public mail address. The Verified messages are forwarded to the recipient mail subscriber. Unverified messages can be discarded, blocked, quarantined, marked as spam or forwarded to junk mail box of the recipient mail subscriber.

The initiation of a secure connection can be triggered as described above by an unapproved subscriber (one with which a secure connection has not been established yet) sending a message to the protected subscriber or optionally can be initiated by the protected user to approve his contact list or specific subscribers he whishes to communicate with in a secure connection. The initiation of a secure connection can be further triggered when a protected subscriber sends a message to an unapproved subscriber.

Figure 1A:
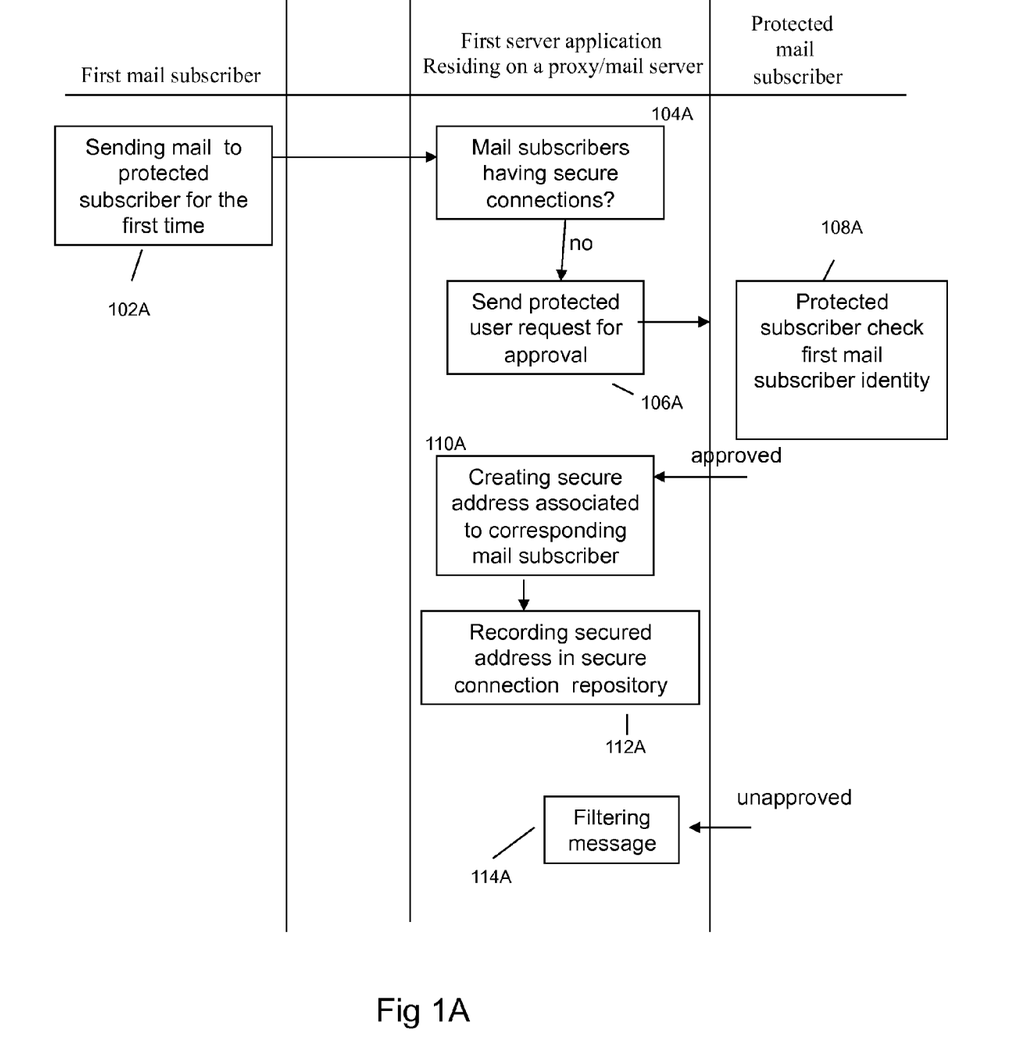
FIG. 1A is a flow chart illustrating the method of establishing a secure connection using the filtering service according to some embodiments of the invention.
Figure 1B:
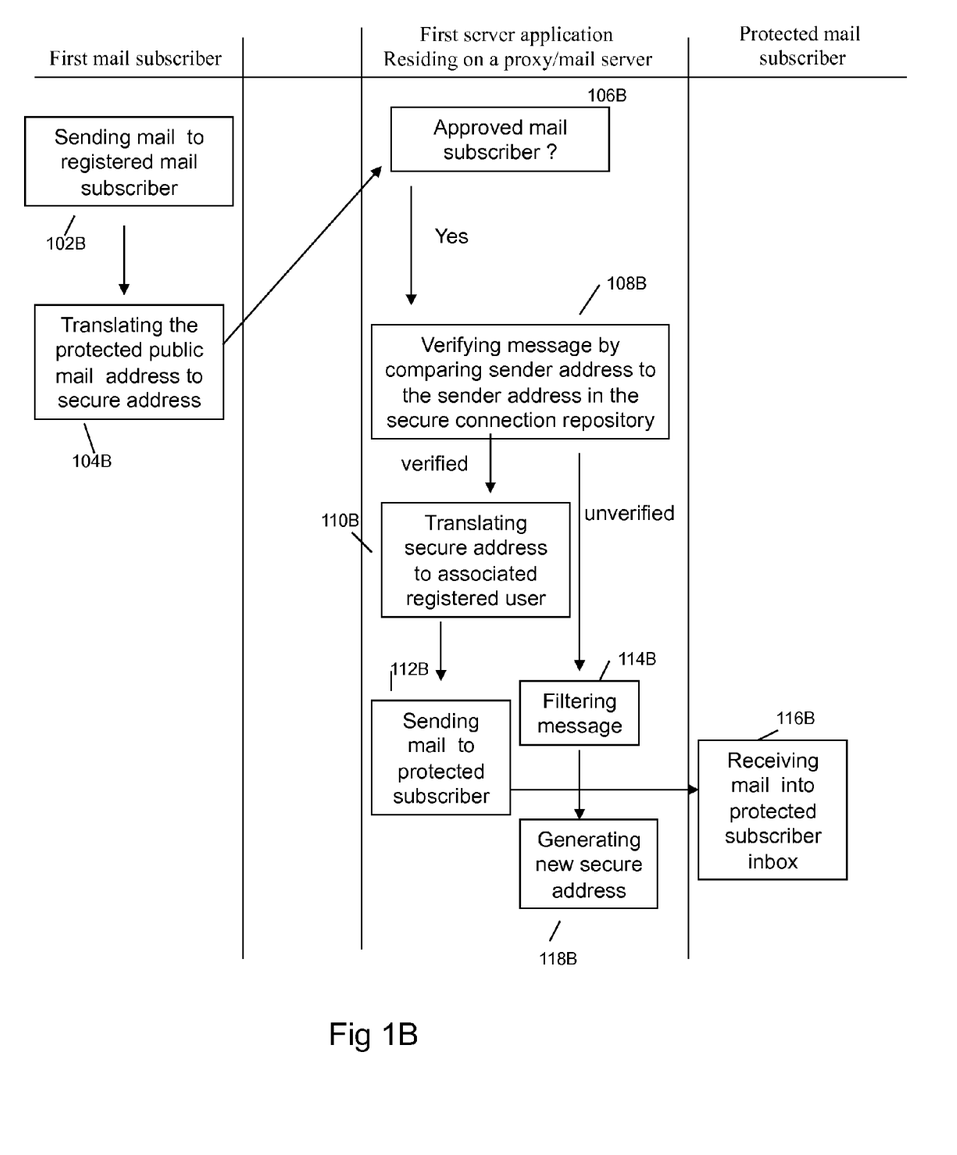
FIG. 1B is a flow chart illustrating the method of exchanging emails using the filtering service according to some embodiments of the invention.
Figure 2A:
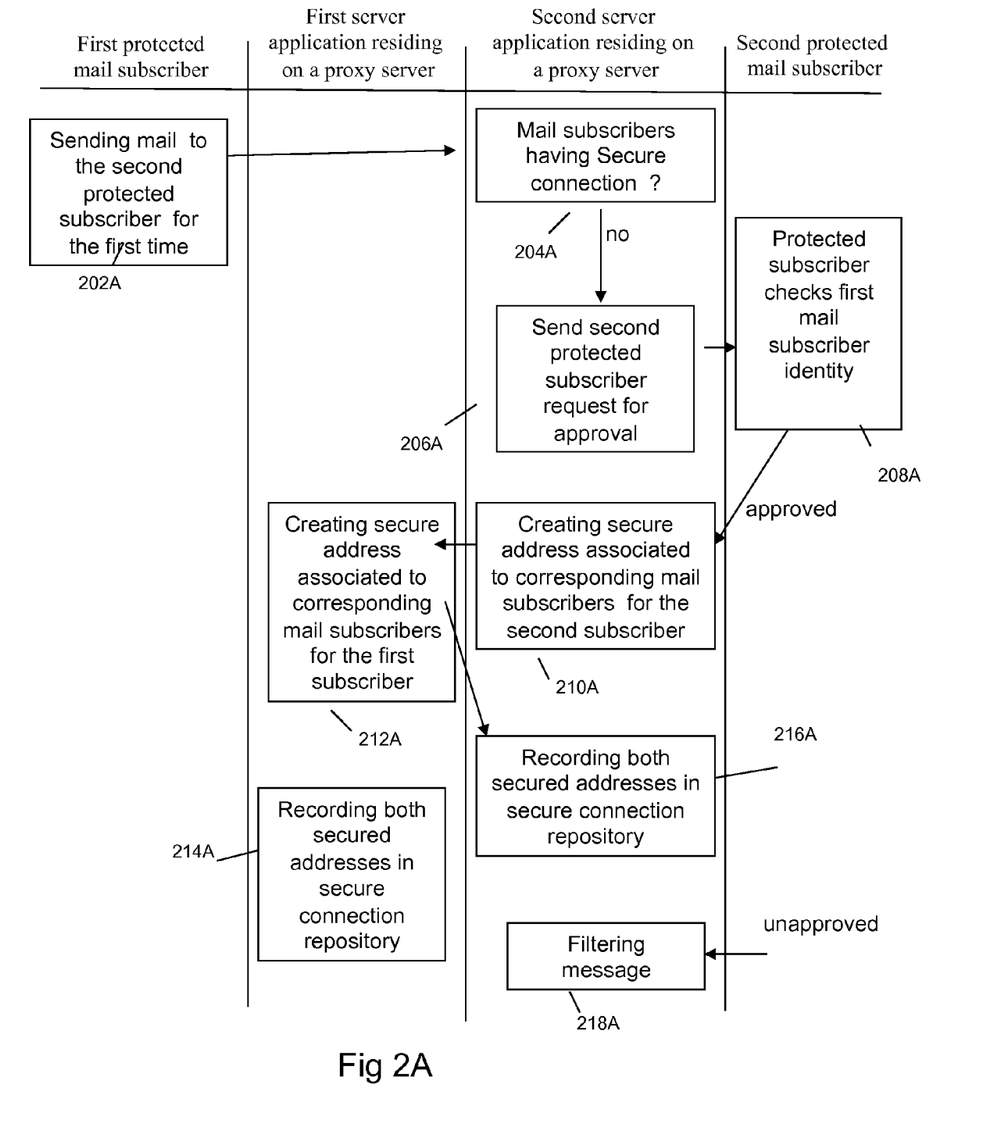
FIG. 2A is a flow chart illustrating the method of establishing a secure connection using the filtering service according to some embodiments of the invention.
Figure 2B:
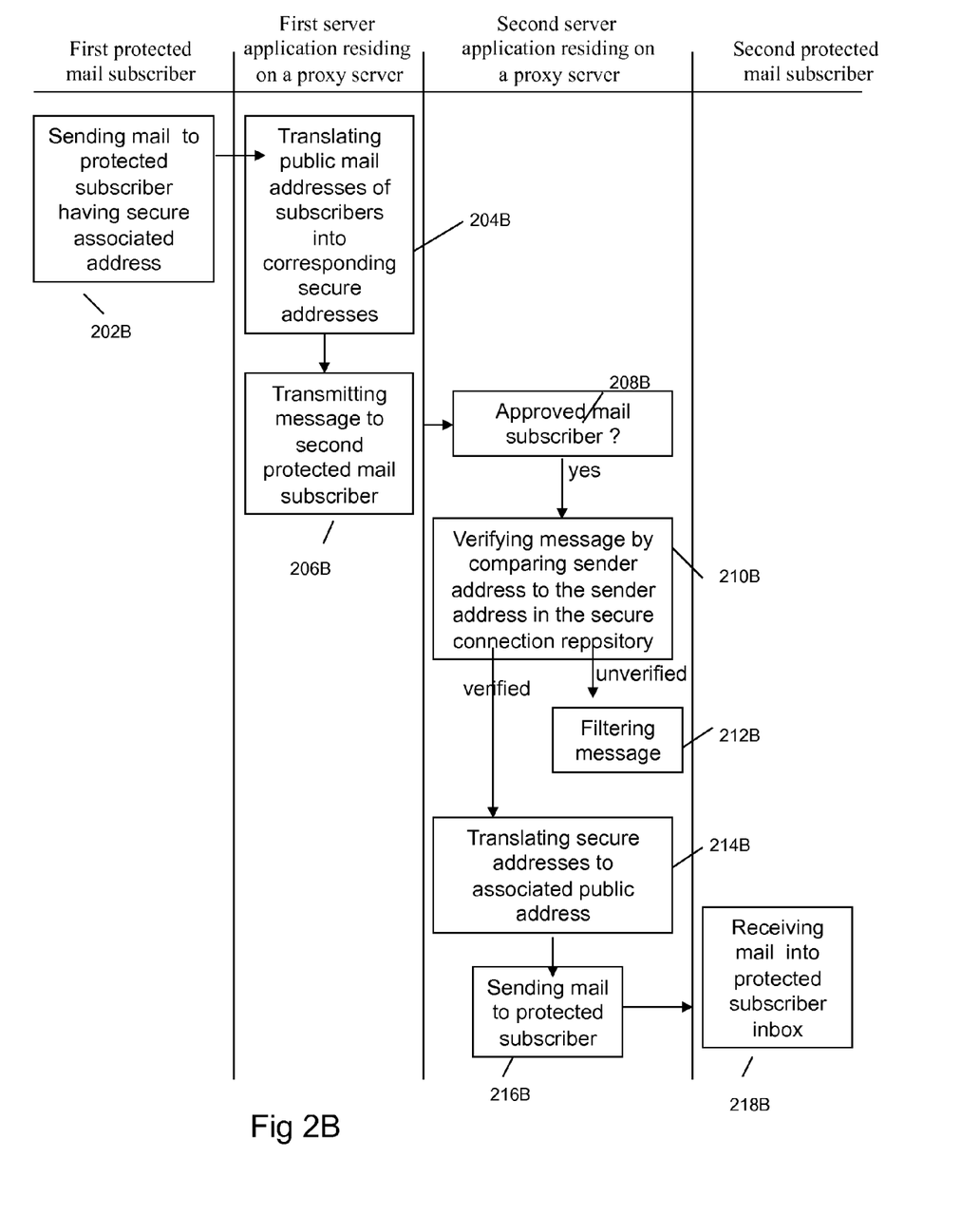
FIG. 2B is a flow chart illustrating the method of exchanging emails using the filtering service according to some embodiments of the invention.

The system may include one or more server application. According to one embodiment of the present invention as illustrated in FIGS. 1A and 1B the system includes only one server application and just one of the mail subscribers is a protected subscriber. According to a different embodiment of the present invention as illustrated in FIGS. 2A and 2B the system includes two server applications and both mail subscribers are protected subscribers.

FIG. 1A illustrates the handshaking procedure and establishment of a secure connection. The first mail subscriber sends a message to a protected subscriber 102A, the server application intercepts the message and checks the subscriber identity 104A, if there is no secure connection with this subscriber, the server application suggests to the protected subscriber to establish a secure connection with this subscriber, to continue exchanging unsecure messages with this subscriber (whitelisting) or to block messages from this subscriber from now on (blacklisting). This suggestion can be presented to the protected subscriber either in a separate interaction with the protected subscriber while the original message is held by the server application or as visual tags or options on the original message. If the protected subscriber wishes to establish a secure connection he/she is being requested by the server application to approve the identity of this subscriber 106A. If the first subscriber is approved by the protected subscriber 108A, the server application establishes a secure connection and generates a new unique secure mail address 110A which is recorded and associated with public mail address of both subscribers 112A. The generated address in unique in the entire mail domain of the protected user. The recordation is saved in a secure connection repository and the secure address is sent to the first subscriber to be used in future communication with the protected user. In case the protected subscriber does not approve the identity, the message is filtered 114A: the message can be discarded, blocked, quarantined, marked as spam, marked as unverified or forwarded to junk mail box of the recipient mail subscriber.

FIG. 1B. illustrates the process of exchanging emails between one public mail subscriber and a protected subscriber having a secure connection. The first subscriber composes a new message to the protected subscriber 102B, the target mail address is translated into the associated secure mail address corresponding to protected subscriber 104B, the translation may be carried out automatically or manually executed by the subscriber. The translated message is transmitted to the protected subscriber and intercepted by the server application. The server application identifies secure messages by checking if the address of the message is associated with a secure connection 106A. If the message is secure, the server application verifies the messages by comparing the sender's address to the address in the secure connection repository 108A. If the message is verified, the server application translates the secure address to the public address of the protected subscriber 110B and forwards the message to the his inbox optionally tagging it as a verified message 112B. Unverified messages can be discarded, blocked, quarantined, marked as spam, marked as unverified or forwarded to junk mail box of the protected subscriber 112B. According to some embodiments, if the recipient address matched a secure connection, but the message is not verified, the server application identifies a security breach, changes the secure address by generating a new one 118B and notifies both subscribers. According to other options a security breach may cause to cancel the secure connection and/or block future messages from the public address of the sender.

When the protected subscriber sends a message to an approved subscriber the server application intercepts the message and replaces the public sender address of the protected subscriber with the secure address associated with this approved user. It then forwards the modified message to the approved user.

According to one embodiment of the invention, in case an approved subscriber with which a secure connection has already been established, sends a message to the public mail address of the protected subscriber, the message is not blocked, but the sender is reminded to use the secure address in future communication.

FIG. 2A. illustrates the handshaking procedure and establishment of a secure connection between two protected subscribers, were each protected subscriber is associated with one server application. The initiation of new secure connection starts when a first protected subscriber sends a message to a second protected subscriber 202A. The second server application intercepts the message and checks if a secure connection for the corresponding pair of subscribers exists 204A. In case of existing secure connection the scenario of exchanging mail is described bellow when referring to FIG. 2B. If the there is no secure connection, the server application suggests to the protected subscriber to establish a secure connection with this subscriber, to continue exchanging unsecure messages with this subscriber (whitelisting) or to block messages from this subscriber from now on (blacklisting). This suggestion can be presented to the protected subscriber either in a separate interaction with the protected subscriber while the original message is held by the server application or as visual tags or options on the original message. If the protected subscriber wishes to establish a secure connection he/she is being requested by the server application to approve the identity of this subscriber 206A. The second protected subscriber checks the identity of the first subscriber 208A. In case the second subscriber approves, the corresponding server application of the second subscriber generates a new secure mail address unique for the second subscriber mail domain, 210A the secure address is transmitted to first subscriber and intercepted and recorded by the first server application. The first server application generates a new secure mail address unique for the first subscriber mail domain 212A, records said unique mail addresses in the secure connection repository in association to the addresses of both subscribers 214A and transmitting the generated secure address to the second subscriber. The message is intercepted by the second server application and the new secure address is associated with public and secure mail addresses of both subscribers, and saved in the secure connection repository of the second server application 216A. In case the second protected subscriber didn't approve the identity, the message is filtered 216A: the message can be discarded, blocked, quarantined, marked as spam, marked as unverified or forwarded to junk mail box of the recipient mail subscriber.

FIG. 2B illustrates the process of exchanging emails between two protected subscribers using two server applications which have already established a two-way secure connection between them. The first subscriber composes and transmits a message targeted to the public address of the second subscriber 202B. The first server application intercepts the message, determines it is associated with a secure connection and translates the source and the target public addresses into the associated secure addresses based on the established secure connections repository 204B.

The modified message is transmitted to the second subscriber 206B and intercepted by the second server application, where the message's addresses are examined. First, the server application identifies secure message by checking if the target address is associated with an established secure connection 208B. The secured message is then verified by checking the secure sender address of the first subscriber matches the one stored in the secure connection associated with the recipient's secure address 210B.

If the message is verified, the secure addresses are translated into public addresses 214B and forwarded to the second subscriber's inbox 216B. Unverified messages can be discarded, blocked, quarantined, marked as spam, marked as unverified or forwarded to junk mail box of the recipient mail subscriber 212B. According to some embodiments, if the secure address matched a secure connection, but the message is not verified the server application identifies a security breach and changes the secure addresses by generating a new one. According to other options a security breach may cause to cancel secure connection and/or block the addresses of the sender.

According to one embodiment of the invention, in case an approved subscriber with which a secure connection has already been established, sends a message to the public mail address of the protected subscriber, the message is not blocked, but the sender is reminded to use the secure address in future communication.

The above described process of transferring mails through the server application where both subscribers are protected, provides the subscribers with a transparent solution for filtering emails using their original public mail address.

The two server applications communicate with each other using a dedicated protocol which is used to coordinate activities such as the establishment of a secure connection, the regeneration of secure addresses, the cancellation of a secure connection and the like.

According to another embodiment of the present invention, the process of establishing a secure connection may include enhanced security measures. The sender subscriber may be requested to fill in a request form for establishing the secure connection, and the request form is transmitted by the server application to the second subscriber. The filled form is presented to the protected subscriber which then decides whether to approve the second subscriber. Another measurement may include challenge response procedure, such as CAPCHA that the sender subscriber may need to perform as part of the establishment of the secure connection. Additional Security measures may include a procedure for periodically changing the secure mail addresses of each established connection.

The process of assimilating the filtering service for a new protected subscriber may be implemented gradually, for an interim period the subscriber may receive messages both over secure and non-secure connections. The subscriber may be able to define what type of messages he is willing to receive over an unsecure communication (using the public email addresses). For speeding up the assimilation process the protected subscriber can automatically define secure connections for all or a subset of his personal contacts or any other list of contacts. Approved subscribers that are associated with a secure connection but that didn't use the secure address may be reminded to use it in the future.

For enhancing the quality of the filtering and promoting the filtering service, unprotected subscribers may receive an invitation from the protected subscriber to register to the service.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method for blocking unsolicited electronic messages transmitted through a data communication network, wherein a mail subscriber is using an email client which includes an inbox, outbox and each message includes a source mail address of the sender and a target mail address of the message destination, said method comprising:

providing a filtering service for at least one mail subscriber having a public mail address, wherein said subscriber is protected from spam mail or other undesired mail, said service comprising:

i. establishing a secure connection between at least one protected mail subscriber and a second mail subscriber, both having public mail addresses, wherein the connection is established upon approval of the second subscriber by the protected mail subscriber;

ii. generating a secure new mail address for each protected subscriber in the secure connection, said new address is unique for the mail domain of said new mail address;

iii. recording said secure new address in association with the public mail addresses of the subscribers in a secure connection repository and sending the second subscriber the secure address to be used in future communication with the protected subscriber instead of the protected subscriber's public mail address;

iv. translating the public target mail address of each message sent by the second subscriber to the secure mail address associated with the public mail address of each message;

v. intercepting and screening incoming messages of the protected mail subscriber, for identifying secure messages by checking whether the target address of the message is associated with a secure connection;

vi. verifying secure message by comparing the sender's address to the recorded sender address in the secure connection repository;
vii. translating between secure mail address and the public mail addresses of verified messages; and
viii. forwarding the verified message to the public target mail address of the protected subscriber;
wherein at least part of the steps are preformed by a server application.

2. The method of claim 1 further comprising the step of intercepting and screening outgoing messages of the protected mail subscriber and replacing the public sender address of protected subscriber by the associated secure address when the recipient is an approved subscriber.

3. The method of claim 1 wherein the establishment of the secure connection requires the second mail subscribers to fill in a request form before the protected subscriber approves his identity.

4. The method of claim 1 wherein the approval process includes a challenge response authentication procedure.

5. The method of claim 1 wherein the subscriber's email client includes a junk mail folder and verified messages are forwarded to the an inbox of the mail subscriber, and unverified messages are discarded, blocked, marked as SPAM, marked as unverified or forwarded to the junk mail folder of the protected mail subscriber.

6. The method of claim 1 wherein a new secure address is generated for a the secure connection when a message associated with said secure connection is not verified.

7. The method of claim 1 wherein the public mail address of mail subscribers blacklisted by the protected subscriber are blocked and messages coming from said addresses are discarded, or quarantined or defined as spam mail.

8. The method of claim 1 wherein unsecure messages are forwarded to the a subscriber inbox according to subscriber selection.

9. The method of claim 1 wherein secure connection can further be established by automatically approving a group of mail subscribers.

10. The method of claim 1 wherein initiation of the secure connection can be further triggered when the protected subscriber sends a message to an unapproved subscriber.

11. The method of claim 1 wherein both subscribers are protected by the filtering service and messages exchanged between them are intercepted by both server applications, wherein each server application generates a separate secure mail address for the respective protected mail subscriber, and each secure mail address is recorded and associated with the public and secure mail addresses of the corresponding mail subscriber.

12. The method of claim 10 wherein transmission of messages between two protected subscribers, comprise: intercepting an outgoing mail by a first server application, translating the target public mail address and the source mail address into the secure mail addresses associated with the corresponding target mail address and source mail address, transmitting the message with the translated addresses, intercepting of the message by the server application of the receiving subscriber, verifying the message, translating the sender's and receiver's secure addresses of verified messages into their public mail addresses and forwarding the message to the receiving subscriber.

13. The method of claim 10 further comprising the step of informing the second subscriber of the establishment of a secured connection and sending him an invitation to join the secure connection, wherein upon approving said invitation a two way secure connection is established.

14. The method of claim 1 wherein the secure mail address is changed periodically according to predefined rules.

15. The method of claim 1 wherein the server application passes transparently, without any modifications, messages sent by the protected subscriber to unapproved subscribers thereby allowing it to communicate with them in an unsecure communication.

16. A system for blocking unsolicited electronic messages transmitted through a data communication network, wherein a mail subscriber is using an email client which includes an inbox, outbox and each message includes a source mail address sender and a target mail address of the message destination, said system comprising:
a server application for providing a filtering service between at least one protected mail subscribers and a second mail subscriber, said server application comprising:
i. a communication module for establishing secure connections between at least one protected mail subscriber and a second mail subscriber having a public mail address, wherein the connection is established upon an approval of a second subscriber's identity by the protected mail subscriber;
ii. a repository of secure connections including records of secure mail addresses created for each secure connection, wherein secure new mail addresses are generated for the protected subscriber in the secure connection, said new address is unique for the mail domain of the secure mail address, wherein each secure address is associated with the public mail addresses of the subscribers in a specific secure connection;
iii. an interception and screening module for identifying a secure message by checking whether the target address of the message is associated with a secure connection and for verifying secure message by comparing the sender's address in the intercepted message to the sender address in the secure connection repository;
iv. a transmission module for forwarding the verified messages to the public target mail address by translating between the secure mail address and the public mail address of verified messages; and
v. an exchange module for translating the public target mail address of outgoing messages of the second mail subscriber to associated secure mail address.

17. The system of claim 15 wherein the outgoing messages of the protected subscriber addressed to an approved subscriber, are intercepted by the server application which replaces the public sender address of the protected subscriber with the secure address associated with this approved subscriber and forwards the message with the translated addresses to the approved subscriber.

18. The system of claim 16 wherein the communication module further requires the second mail subscribers to fill in a request form before the protected subscriber approves the second subscriber's identity.

19. The system of claim 16 wherein the communication module further includes a challenge response authentication procedure.

20. The system of claim 16 wherein the email client includes a junk folder and verified messages are forwarded to the inbox of the mail subscriber, and unverified messages are discarded, blocked, quarantined, marked as SPAM, marked as unverified or forwarded to the junk mail folder of the protected mail subscriber.

21. The system of claim 16 wherein the public mail address of mail subscribers blacklisted by the protected subscriber is blocked and messages received from said addresses are discarded, or quarantined or defined as spam mail.

22. The system, of claim 16 wherein a new secure address is generated for the secure connection if a message associated with said secure connection is not verified.

23. The system of claim 16 wherein secured connection can further be established by automatically approving a defined group of mail subscribers.

24. The system of claim 16 wherein the secure mail address is changed periodically according to predefined rules.

25. The system of claim 16 wherein the exchange module is an automatic applet or add-on associated with the mail client of the subscriber.

26. The system of claim 16 wherein the translation within the exchange module is preformed by the subscriber.

27. The system of claim 16 wherein the server application is part of a proxy sever or mail server.

28. The system of claim 16 further comprising a second server application, wherein both subscribers are protected by the filtering service and each server application intercepts and filters the messages of the protected subscriber which is associated with said server and generates a secure email address associated with its protected subscriber, wherein the exchange module at each subscriber application translates between the public mail addresses of each corresponding subscriber and the associated secure mail addresses and the transmission module carries out a reverse translation.

29. The system of claim 28 wherein a communications protocol between the server applications is maintained enabling at least one of: creating secure connection by one way handshaking procedure or two way handshaking procedure, canceling secure connection by request of at least one protected mail subscriber, regenerating at least one secure address of the secure connection.

* * * * *